United States Patent

[11] 3,612,308

| [72] | Inventor | Kaspar Klaus<br>46 Schlachthofstrasse 894,<br>Memmingen/Bavaria, Germany |
|---|---|---|
| [21] | Appl. No. | 796,736 |
| [22] | Filed | Feb. 5, 1969 |
| [45] | Patented | Oct. 12, 1971 |
| [32] | Priority | Feb. 6, 1968 |
| [33] | | Germany |
| [31] | | P 16 80 137.9 |

[54] LOADING INSTALLATION FOR ROAD TRANSPORT VEHICLES
8 Claims, 11 Drawing Figs.

[52] U.S. Cl. ..................................................... 214/77
[51] Int. Cl. ..................................................... B60p 1/48
[50] Field of Search........................................... 214/77, 78, 80; 212/8, 8 A

[56] References Cited
UNITED STATES PATENTS

| 3,448,874 | 6/1969 | Martinson .................... | 214/77 x |
| 3,513,997 | 5/1970 | Heyer et al. .................. | 214/77 |
| 2,795,342 | 6/1957 | Steele........................... | 214/78 |
| 2,971,661 | 2/1961 | Isaacs, Jr. ..................... | 212/8 X |
| 3,174,630 | 3/1965 | Tantlinger et al............. | 214/77 UX |
| 3,232,460 | 2/1966 | Rouse........................... | 214/77 |
| 3,259,258 | 7/1966 | Fisher........................... | 214/77 X |
| 3,451,568 | 6/1969 | Kuster.......................... | 214/77 |
| 3,468,439 | 9/1969 | Olitsky et al.................. | 214/77 |

FOREIGN PATENTS

| 1,279,458 | 11/1961 | France .......................... | 214/80 |
| 1,488,640 | 6/1967 | France .......................... | 214/77 |
| 1,112,454 | 8/1961 | Germany...................... | 214/78 |
| 887,999 | 1/1962 | Great Britain................ | 214/77 |

*Primary Examiner*—Gerald M. Forlenza
*Assistant Examiner*—Robert J. Spar
*Attorney*—Holman & Stern ABSTRACT: A load transport vehicle having a frame provided with a loading installation for the lateral loading and unloading of at least an essential part of the load in which the installation includes at least two pivoting units, one unit being located before and the other unit behind the loaD on the frame in the direction of movement of the vehicle, each unit being provided with a first lifting arm means pivotally mounted on the frame with the pivotal axis extending parallel to the longitudinal axis of the vehicle, and a second lifting arm means pivotally connected to the first arm means for movement about an axis extending parallel to the longitudinal axis of the vehicle, the second lifting-arm means constituting a load support component, and the operating range of both arm means extending over both sides of the vehicle frame.

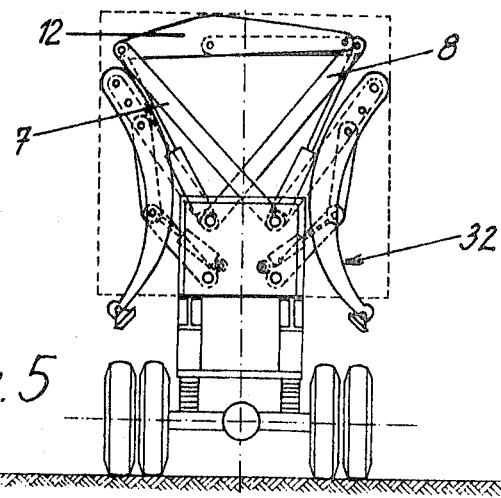
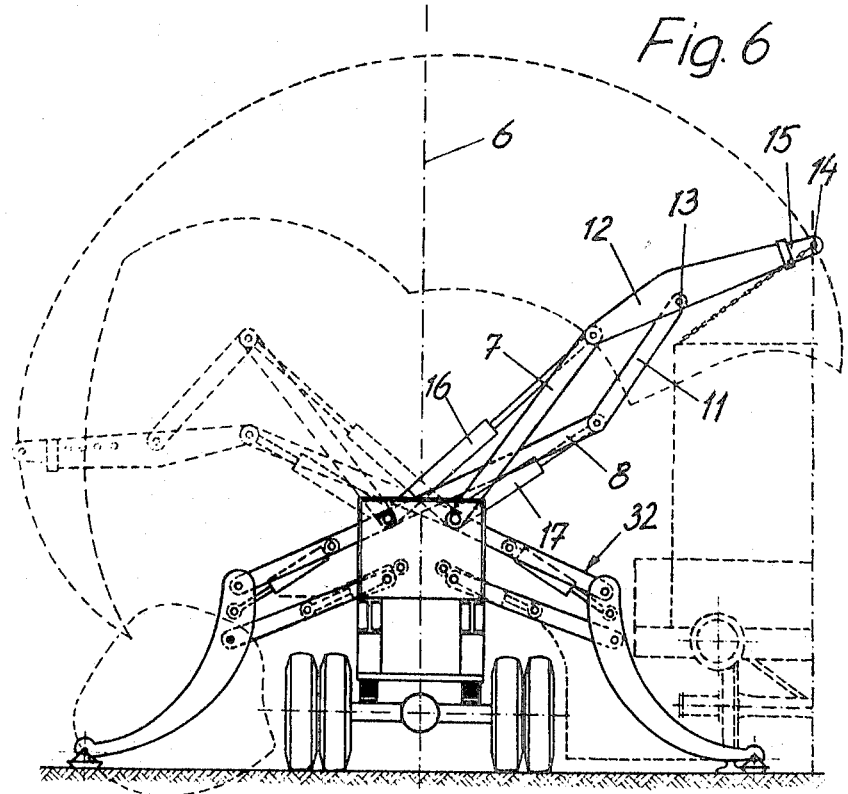

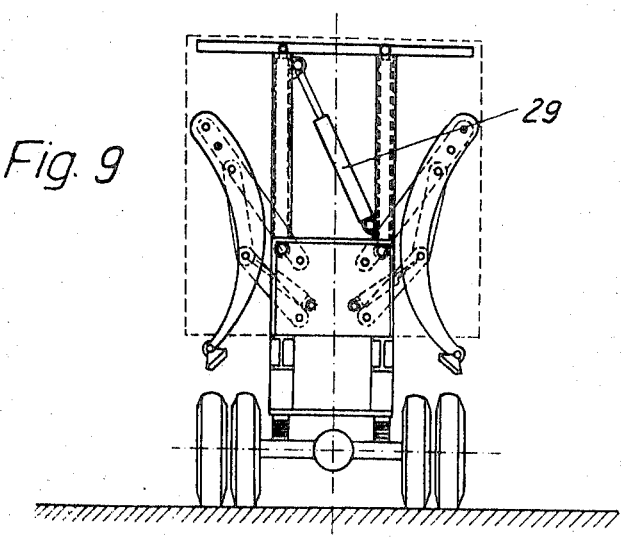
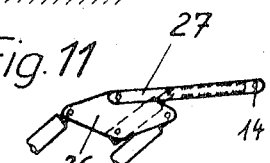
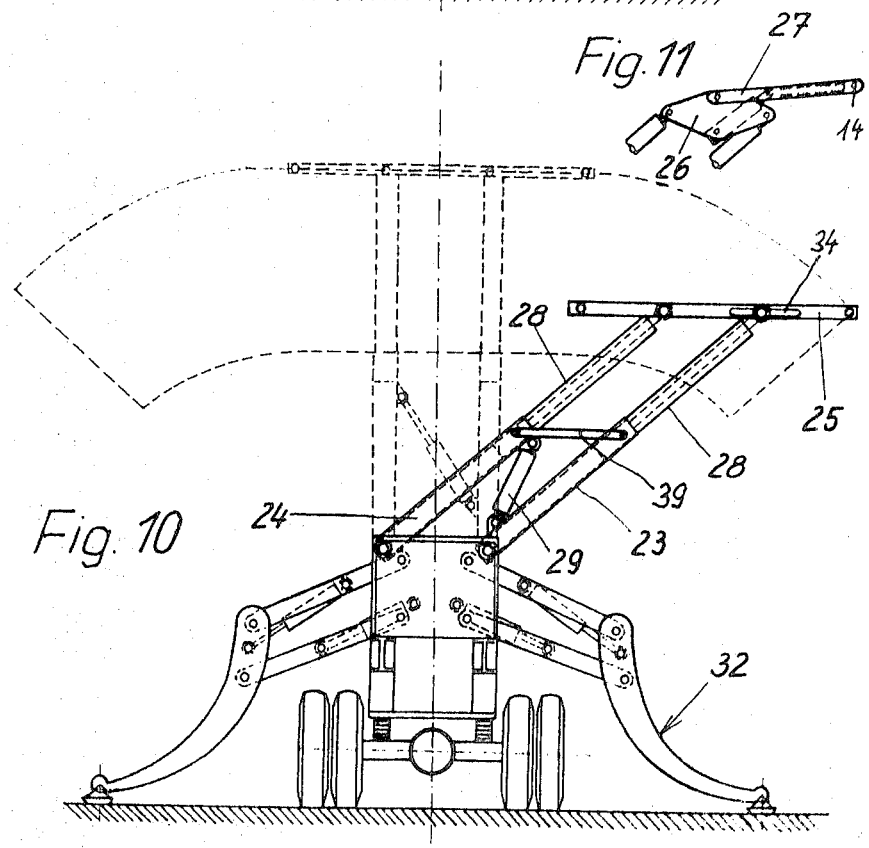

LOADING INSTALLATION FOR ROAD TRANSPORT VEHICLES

The present invention relates to a loading installation, particularly with a hydraulic drive for the loading and unloading of at least a considerable part of the load of a road transport vehicle in one single operation.

For loading and unloading, respectively, of the total load of a road transport vehicle, particularly a container, in one single-loading operation, loading installations are known, which consist essentially of two loading devices. One loading device is arranged in the direction of movement or travel in front of the load and the other loading device behind the load. Both loading devices are rigidly connected with the transport vehicle. With a loading installation of such type, it is possible to lift the load from the vehicle and to remove it laterally or to transfer it, respectively, to another vehicle.

A known loading device of the above-mentioned type comprises essentially two lifting rocker arms. The first lifting rocker arm is mounted on the vehicle. The second lifting rocker arm is articulated to the first lifting rocker arm and is supported on the first arm and the load acts upon the second lifting rocker arm. A loading device of this type is advantageous in that the working range is relatively large. The two lifting arms can be pivoted in such a manner that a loading operation is possible even if e.g. recess the front or the rear surface of the load is difficult. The known loading devices of this type are, however, designed in such a way that the load can be unloaded only on one side of the vehicle or can be loaded, respectively, from one single side thereof.

In another loading installation for the purpose above mentioned, each loading device consists of a pair of telescopic supports. One telescopic support is carried on one side of the vehicle, and the other on the other side. The upper extremities of the telescopic supports are connected with each other and take up the load. It is clear that in case of a nonuniform length of the telescopic supports, the point of application of the load can be brought at will to one or the other side of the vehicle. It is, therefore, possible to work on one side as well as on the other of the vehicle.

Installations of the type mentioned hereinbefore, are however not fully satisfactory. A telescopically retractable hydraulically driven support can indeed take up sufficient pressure forces, but only little traction forces.

The telescopic construction diminishes greatly the piston surface through which traction forces can be exerted. If with a loading device of the type mentioned hereinbefore, a large projection is desired, the traction forces created in another one of the supports are considerable and the loading process is thereby rather difficult to execute.

In another similar design, use is made of the retraction to enlargen the base of the two telescopic supports in order to absorb only pressure forces in the telescopic support as far as is possible or to exert respectively only pressure forces. The telescopic supports are, in this case, not carried on the frame of the vehicle, but on supporting legs, which are retractable. This configuration makes it necessary that in the loading process, the supporting legs can always be fully extended, which is not always possible. Besides, it is a condition for the use of such loading devices that the extremities of the load are always fully accessible.

SUMMARY OF THE INVENTION

By the invention, a loading device is provided which can become active on both sides of the vehicle without special conditions as far as the accessibility of the load extremities is concerned.

The invention starts from a loading installation, particularly with a hydraulic drive for loading or unloading, respectively, of at least a considerable part of the load of a road transport vehicle in one single-loading operation, whereby the loading installation consists of two loading devices of which one device is, in direction of movement of the transport vehicle, located in front of and the other behind the load of the vehicle, and this device has at least one first lifting arm pivotally mounted on the vehicle and on which a second articulated lifting arm is fastened, on which the load is applied. The configuration according to the invention is characterized essentially by the fact that the ranges of both lifting arms extend over both sides of the vehicle.

The invention is described in detail with further features in different embodiments by means of the accompanying drawings. These drawings represent diagrammatic representations of loading devices seen in each case in direction of motion.

BRIEF DESCRIPTION OF THE DRAWINGS

FIGS. 5 and 6 show another embodiment corresponding to the invention in two different operating positions, FIGS. 9 and 10 are two representations of a further embodiment corresponding to the invention in two different operational positions, and FIG. 11 shows a detail of the invention.

DETAILED DESCRIPTION OF THE DRAWINGS

Figure 1:
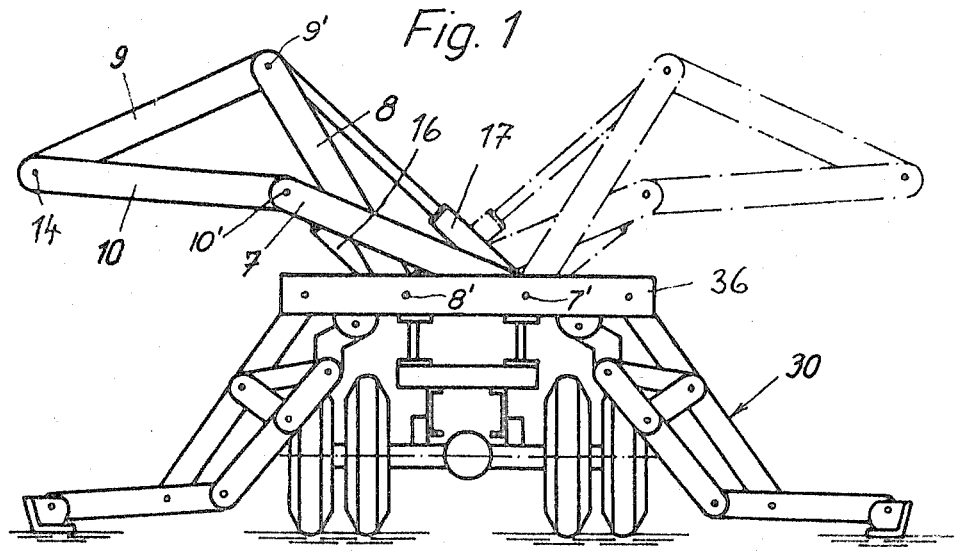
FIG. 1 is a preferred embodiment according to the invention.

In the embodiment according to FIG. 1, the loading device is carried on a frame 36, which can be the frame of the vehicle or also a separate auxiliary frame. The frame 36 serves simultaneously to carry also the supporting legs which are generally necessary. In the FIG. 1 embodiment, a supporting leg 30 is of a retractable articulated design.

On the frame 36 first and third as levers or arms 7 and 8 respectively are articulated and arranged in such a way that they always cross each other in the different operational positions. In this manner a basis for an outer lifting arm or the like is formed, which can become active in the same manner on one or the other side of the vehicle. The levers 7, 8, thus form the first component of the lifting arm and the levers are articulated on the vehicle at 7', 8' respectively. For the drive of the arms 7 and 8, cylinder piston arrangements 16 and 17 are provided. It is by principle also possible to effect the drive e.g. only by one single cylinder piston arrangement 17 and to provide instead of the other cylinder piston arrangement 16, a cylinder piston arrangement between the free extremities of the levers 7 and 8.

In the embodiment according to FIG. 1, the second component lifting arm is defined by second and fourth levers or arms 9 and 10. The levers 9 and 10 are articulated to the free ends of the levers 7 and 8 as shown at 9' and 10' respectively. A connection joint between the free ends of the second and fourth levers forms a point of application 14 for the load.

The position in which the loading device works on the left-hand side of the vehicle is shown in the drawing in full lines. The position for the work on the right-hand side of the vehicle is indicated with dot-and-dash lines.

Figure 2:
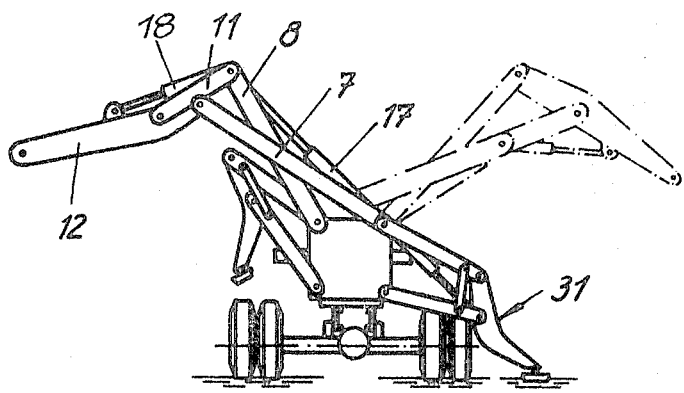
FIG. 2 and FIG. 3 are two modified embodiments similar to the embodiment according to FIG. 1.

The embodiment according to FIG. 2 is different from that of FIG. 1 essentially by the fact that instead of the pair of levers 9, 10, a lifting arm 12 is carried on the pair of levers 7, 8 and more specifically on the lever 7 which is supported by means of a lever 11 on the other lever 8 and can be moved by a cylinder piston arrangement 18. The left-hand and the right-hand position are, in this case, not completely symmetric, but a nearly similar operation is possible. Supporting legs 31 are guided in FIG. 2 by an articulated square whereby one of the levers is supported on the articulation of the levers 7 and 8.

Figure 3:
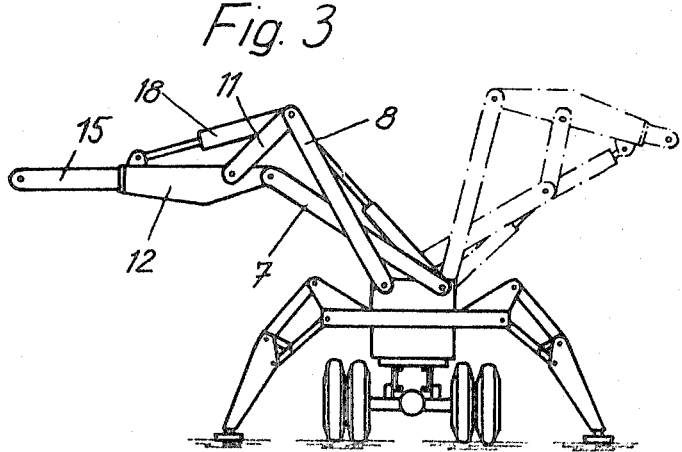

FIG. 3 shows a further variant in which the points of support of the loading device and of the supporting legs are separated from each other and a second lifting arm 12 has an extensible element 15.

Figure 4:
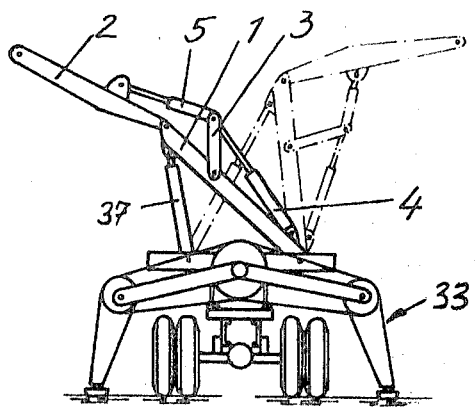
FIG. 4 is another modification of the invention.

In the variant according to FIG. 4, a one-part lifting arm 1 is provided which is pivotally mounted on the vehicle frame or an auxiliary frame and is moved by a cylinder piston arrangement 37. The lifting arm 1 carries a second lifting arm 2 and the drive of this second lifting arm is made by means of two cylinder piston arrangements 4 and 5 which are coupled to each other, above a lever 3.

The supporting legs 33 are controlled in the embodiment according to FIG. 4 by a guide which results approximately in a parallel movement of the outer supporting leg part. The control is carried out in such a way by means of holding ropes that in retracting, an automatic inward swinging of the outer supporting leg element takes place so that the space requirements are relatively small.

FIGS. 5 and 6 show a further embodiment according to the invention in which supporting legs 32 have modified parallelogram guides. The second lifting arm 12 carried by the pair of levers 7 and 8 is supported, similar to the embodiment according to FIGS. 2 and 3, by means of a lever 11. For the drive the symmetrically supported cylinder piston arrangement 17 and 18 are, however, provided.

FIG. 5 shows how narrowly the supporting legs and the loading device can be collapsed, while FIG. 6 shows a very large working range and in addition the supporting range of the supporting legs 32.

Figure 7:
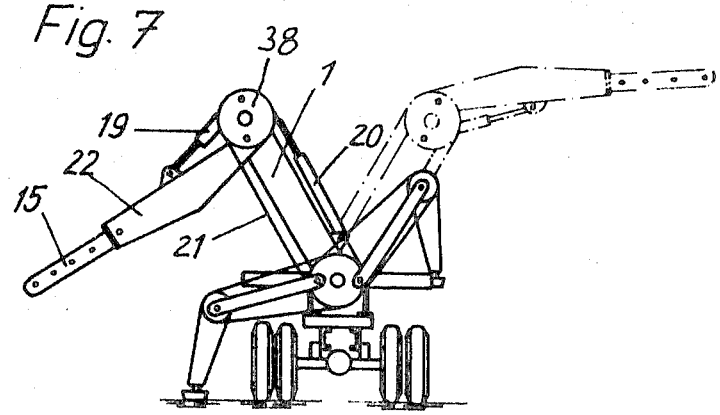
FIGS. 7 and 8 show two further modifications of the invention.
Figure 8:
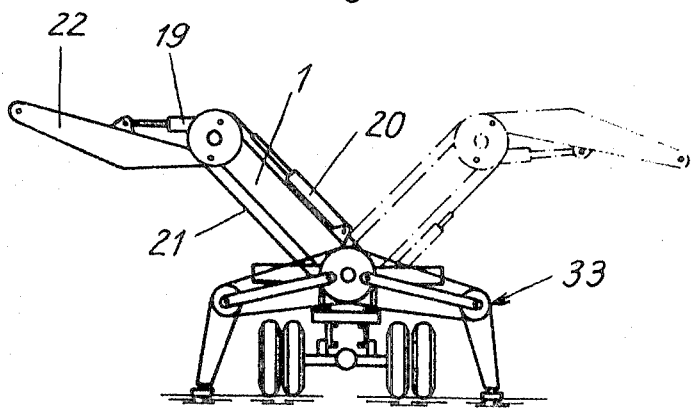

In the modified embodiments according to FIGS. 7 and 8, the first lifting arm 11 is formed by a parallelogram guide consisting essentially of the rigid part 1 and the guide rope 21. If the arm 1 is pivoted from the left-hand to the right-hand side or vice versa, there is a parallel guiding for the parts carried on a disc 38. Thereby it is provided in the embodiment according to FIG. 7 that lifting arm 22 is pivotal with its pivoting device, i.e. the cylinder piston arrangement 19 by means of the cylinder piston arrangement 20 and the rope or the chain 21, respectively, in order to obtain uniform working ranges on both sides of the vehicle. Instead of the drive by means of the parts 20 and 21, a pivoting movement of the disc 38 or the like can also be obtained by other means, particularly strongly reduced worm and worm wheel drives and other drive mechanisms. While in the embodiment according to FIG. 7 the lifting arm 22 is provided with an extensible element 15, the variant according to FIG. 8 shows a second lifting arm 22 the length of which cannot be varied.

A further embodiment corresponding to the invention is shown in FIGS. 9 and 10. Supporting leg design 32 corresponds, in this case, essentially to those according to FIGS. 5 and 6. The loading device is formed, on the contrary, by two parallelly guided levers 23 and 24, which can be moved by means of a cylinder piston arrangement 29 which extends diagonally between the levers 23 and 24. The levers 23 and 24 receive extensible elements 28 which are moved by special cylinder piston arrangements which are not shown in detail. The extremities of the elements 28 are provided with a carrier device 25 on which the load rests.

If the elements 28 are extended in a different manner, an inclination of the carrier device 25 can be obtained. If now, as is shown in FIG. 10, the extremities of the levers 23 and 24 are connected by a parallelogram lever 39, it is necessary to provide an oblong slot guide 34 or a similar installation.

It is also possible to use instead of the carrying device 25 the carrier device 26 of the FIG. 11 embodiment. This carrier device 26 is provided with a lifting arm 27, for which a special operating cylinder is provided. The lifting arm 27 can operate on one vehicle side, but it is also possible to bring it over to the other vehicle side and to move it by means of the same working cylinder. Possibly an asymmetrical carrying of the lifting arm 27 on the carrier device 26 can be recommended.

As stated already hereinbefore, each loading installation consists of two loading devices. In order to adapt the distance between these two loading devices from each other to the possibly different lengths of the load, it is favorable if at least one of the loading devices is carried on the vehicle in such a manner that it can be shifted in the direction of movement, the invention recommends that the two loading devices of the loading installation are coupled with each other by means of the hydraulic control devices in order to assure a synchronism of both loading devices.

I claim:

1. A load transport vehicle having a frame provided with a loading installation for the lateral loading and unloading of at least an essential part of the load in which the installation includes at least two pivoting units, one unit being located before and the other unit behind the load on the frame in the direction of movement of the vehicle, each unit being provided with a first lever pivotally mounted on the frame with the pivotal axis extending parallel to the longitudinal axis of the vehicle, a second lever pivotally connected to the free end of said first lever for movement about an axis extending parallel to the longitudinal axis of the vehicle, a third lever pivoted to the frame for movement about an axis extending parallel to the longitudinal axis of the vehicle, a fourth lever pivoted to the free end of the third lever for movement about an axis extending parallel to the longitudinal axis of the vehicle, a connection joint between the free ends of the second and fourth levers constituting the point of application of the load, said first and third levers crossing each other in a substantially X-type fashion symmetrically with respect to the middle plane of the vehicle, said first and third levers being swingable to either side of the vehicle about only said pivotal axes, and power means pivotally mounted between said vehicle and said first and third levers for swinging said first and third levers about said axes.

2. The load transport vehicle as claimed in claim 1 in which said power means includes a first cylinder piston assembly operably connected to said first lever and a second cylinder piston assembly connected between said third lever and said frame, with said first and second cylinder piston assemblages being adapted to move said first and third levers.

3. The load transport vehicle as claimed in claim 1 in which at least one cylinder piston assembly constituting the power means is supported at the point of pivoting of said first lever on the vehicle and is cooperable with said third lever of the pivoting units.

4. The load transport vehicle as claimed in claim 1 in which said power means is constituted by two cylinder piston assemblies for said units arranged symmetrically in pairs.

5. The load transport vehicle as claimed in claim 1 in which the power means includes a piston cylinder assembly located between the ends of the first and third levers of each unit.

6. The load transport vehicle as claimed in claim 1 in which the power means includes a piston cylinder assembly located between the point of pivoting of the first lever of one unit and the third lever of such unit.

7. A load transport vehicle as claimed in claim 1 in which means are provided for allowing at least one of said pivoting units to be shifted in the direction of movement of the vehicle.

8. The load transport vehicle as claimed in claim 1 including means whereby said at least two pivoting units are coupled together hydraulically for operation in synchronism.